UNITED STATES PATENT OFFICE.

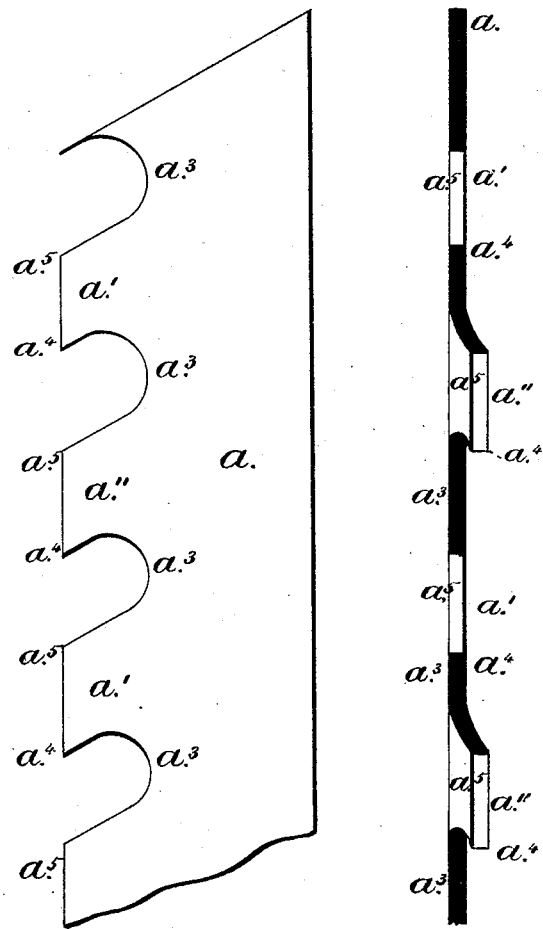

ASA HATCH, OF NEW CASTLE, INDIANA.

IMPROVEMENT IN BAND-SAW TEETH.

Specification forming part of Letters Patent No. 149,120, dated March 31, 1874; application filed March 25, 1874.

*To all whom it may concern:*

Be it known that I, ASA HATCH, of New Castle, Henry county, Indiana, have invented an Improvement in Band-Saw Teeth for cutting staves or other curved pieces of wood from a block or bolt, of which the following is a specification:

My invention relates to a peculiar manner of dressing, setting, and swaging the teeth of a band-saw for dividing staves or other curved pieces of wood from a block or bolt lengthwise of the grain, the teeth being constructed somewhat like the bit and face of a plow-plane, grooving their way through the wood in a similar manner. To allow the block or bolt to describe the curve desired, in passing the saw, during the operation of dividing the stave or piece from the block or bolt, every alternate tooth is set inward toward the center of the curve sufficiently to cut a kerf wide enough to allow free passage of the stave or bolt on the inner side of the saw. The slot which gives form to the teeth is cut in the blade at an angle of about thirty degrees with the face of the teeth, the bottom of the slot or throat of the tooth circular. The faces of the teeth, from point to heel, are parallel with the back of the saw or line of direction of the blade when in operation. The points of the teeth are raised from this parallel line or face by swaging, thus giving a sharp cutting-point to the teeth, the parallel face of the teeth preventing the saw from "feeding in" farther than the depth of the raised point.

Figure 1 represents side view of a section of my band-saw. Fig. 2 represents the face edge of a section of my band-saw.

$a$ represents the body of the saw; $a'$, the teeth in line with the body of the blade; $a''$, the alternate teeth set in toward the center of the circle described by the block or bolt during the operation of cutting; $a^3$, the bottom or throat of the teeth; $a^4$, the points raised by swaging to a cutting-edge; $a^5$, the parallel face of the teeth.

The operation of the saw upon the wood is precisely similar to that of a carpenter's plow-plane, as before mentioned, the wooden or iron face of the plane corresponding with the face $a^5$ of the tooth of the saw; the projection of the bit of the plane below the face of same corresponding with the raised point or cutting-edge $a^4$ of the saw.

I claim as my invention—

The band-saw $a$, provided with teeth $a'$ and $a''$, the latter being set and the former remaining straight, the points of both swaged, as and for the purpose herein shown and described.

ASA HATCH.

Witnesses:
 THOS. J. MYERS,
 W. LILLEY.